United States Patent Office 3,173,918
Patented Mar. 16, 1965

3,173,918
BIS(4-QUINOLYL-PIPERAZINYL) COMPOUNDS
Jean Gaston Baget, Sceaux, Seine, and François Debarre, Antony, Seine, France, assignors to Rhone-Poulenc S.A., Paris, France, a corporation of France
No Drawing. Filed June 10, 1963, Ser. No. 286,471
Claims priority, application France, June 14, 1962, 900,747; Aug. 30, 1962, 908,215
11 Claims. (Cl. 260—268)

This invention relates to new quinoline derivatives, to processes for their preparation and pharmaceutical compositions containing them.

According to the present invention, there are provided the new quinoline derivatives of the general formula:

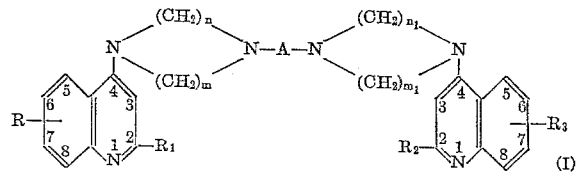

(I)

(wherein A represents a hydrocarbon group containing at most 12 carbon atoms, R and $R_3$ each represent a hydrogen or halogen atom or an alkyl or alkoxy group in the 5, 6, 7 or 8-position of the quinoline nucleus, $R_1$ and $R_2$ each represent a hydrogen atom or an alkyl group, n, $n_1$, m and $m_1$ each represent the integer 2 or 3, and the diazacyloalkane rings

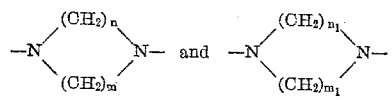

may carry one or more alkyl groups) and their acid addition salts. In this specification and accompanying claims the alkyl and alkoxy groups referred to contain at most four carbon atoms. The hydrocarbon group A may be, for example, a straight or branched alkylene chain (e.g. $-(CH_2)_2-$, $-(CH_2)_3-$, $-(CH_2)_4-$, $-(CH_2)_5-$, $-(CH_2)_6-$,

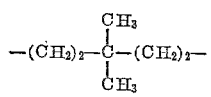

$-(CH_2)_9-$ or $-(CH_2)_{10}$), an ethylenically or acetylenically unsaturated hydrocarbon chain (e.g.

$-CH_2-CH=CH-CH_2-$ or $-CH_2-C\equiv C-CH_2-$ respectively), or a cycloalkylene (e.g. cyclohexylene) or xylylene

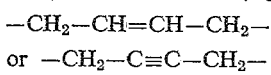

group.

When the hydrocarbon group A of the aforesaid quinoline derivatives contains an asymmetric carbon atom, the compounds can exist in stereoisomeric forms. The present invention includes all stereoisomeric forms of compounds of general Formula I and also acid addition salts of all such compounds.

According to a feature of the present invention, the quinoline derivatives of Formula I are prepared by the process which comprises reacting a compound of the general formula:

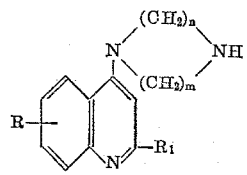

II with a compound of the general formula:

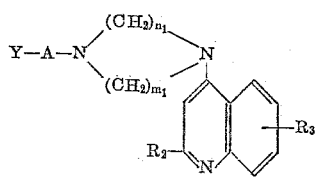

III wherein Y represents the acid residue of a reactive ester such as a halogen atom or a sulphuric or sulphonic ester residue, e.g. a methanesulphonyloxy, benzenesulphonyloxy or toluene-p-sulphonyloxy residue, and the other symbols are as hereinbefore defined. The reaction is preferably effected in an inert organic solvent such as an aromatic hydrocarbon (e.g. toluene), an amide (e.g. dimethylformamide), a sulphoxide (e.g. dimethylsulphoxide) or a ketone (e.g. methyl ethyl ketone) in the presence or absence of a condensing agent selected from the group consisting of alkali metal derivatives and tertiary amine. It is advantageously carried out at the boiling temperature of the solvent employed.

The starting materials of Formula III may be obtained from compounds of the formula:

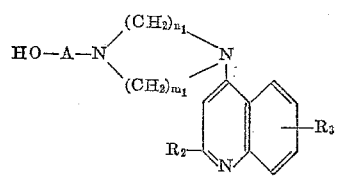

IV (wherein the various symbols are as hereinbefore defined) by methods known per se for the replacement of a hydroxy group in an alkanol by an atom or group Y as hereinbefore defined. By the term "methods known per se" as used in this specification and accompanying claims is meant methods heretofore used or described in the chemical literature.

According to a further feature of this invention, the quinoline derivatives of Formula I, in which R and $R_3$ represent identical atoms or groups in similar positions of the quinoline nucleus, $R_1$ and $R_2$ represent hydrogen atoms or identical alkyl groups, and in the pairs n and $n_1$, and m and $m_1$, the symbols represent the same integer, are prepared by the process which comprises reacting two molecules of a compound of Formula II with a diester of the formula Y—A—Y, wherein A and Y are as hereinbefore defined. The preferred reaction conditions are similar to those mentioned above in respect of the aforementioned process.

According to a still further feature of the invention, the quinoline derivatives of Formula I are prepared by reacting a quinoline derivative of the general formula:

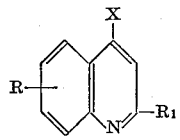

with a compound of the general formula:

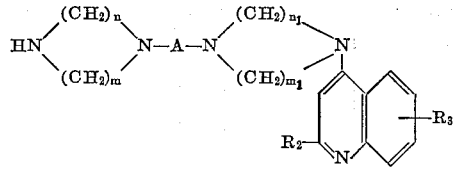

wherein X represents a halogen atom or a methoxy or phenoxy group, and the other symbols are as hereinbefore defined. The reaction may be carried out with or without an inert organic solvent in the presence or absence of a condensing agent. It is preferably effected by heating the reactants in an inert organic solvent of high boiling point, such as an aromatic hydrocarbon (e.g. xylene), an amide (e.g. dimethylformamide) or phenol, at a temperature between 100° and 200° C.

A variant of the last-mentioned process for the preparation of those quinoline derivatives of Formula I, in which R and $R_3$ represent identical atoms or groups in similar positions of the quinoline nucleus and $R_1$ and $R_2$ represent hydrogen atoms or identical alkyl groups, comprises reacting two molecules of a quinoline derivative of Formula V with a compound of the general formula:

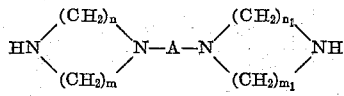

wherein the various symbols are as hereinbefore defined. The reaction may be carried out using the same conditions as those mentioned above in respect of the process involving compounds of formulae V and VI.

According to another feature of the invention, the quinoline derivatives of Formula I, in which the hydrocarbon group A includes methylene (i.e. —$CH_2$—) groups adjacent the nitrogen atoms of the diazacycloalkane rings, are prepared by the process which comprises reducing the carbonyl group or groups of an amide of the general formula:

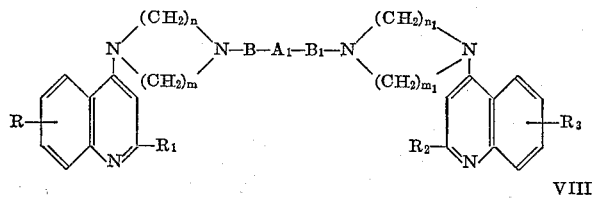

(wherein B and $B_1$ each represent a carbonyl or methylene group, at least one of the symbols representing a carbonyl group, $A_1$ represents a hydrocarbon group containing at most 10 carbon atoms and such that the grouping —$CH_2$—$A_1$—$CH_2$— is identical with the hydrocarbon group A, A and the other symbols being as hereinbefore defined) to methylene by methods known per se for the reduction of the carbonyl group in an amide to methylene. The reduction is preferably carried out with lithium aluminium hydride at ambient temperature or with gentle heating, for example at a temperature between 20° and 50° C., in the presence of an inert organic solvent such as an aromatic hydrocarbon (e.g. xylene) or an ether (e.g. tetrahydrofuran).

The amide starting materials of Formula VIII may be obtained by methods known per se. For example, those compounds in which B represents a carbonyl group and $B_1$ represents a methylene group may be obtained by the reaction of a carboxylic acid chloride of the general formula:

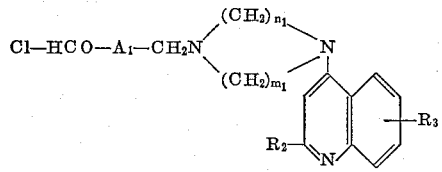

with a quinoline derivative of the general formula:

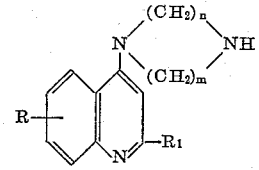

In a similar way those compounds of Formula VIII in which B and $B_1$ represent methylene and carbonyl groups respectively may be obtained by reaction of compounds of the formulae:

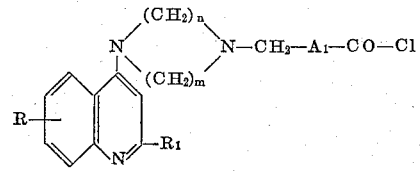

and

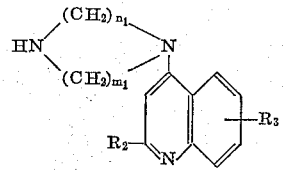

Amides of Formula VIII in which B and $B_1$ both represent carbonyl groups may be obtained by the following methods:

(a) In the case where the symbols R, $R_1$, $n$ and $m$ represent exactly the same atom, group or integer as the symbols $R_3$, $R_2$, $n_1$ and $m_1$ respectively, reaction of one molecule of a carboxylic diacid chloride of the formula Cl—CO—$A_1$—CO—Cl with two molecules of a quinoline derivative of Formula X.

(b) In the case where the symbol $A_1$ represents a divalent symmetric hydrocarbon group, condensation of one molecule of a quinoline derivative of Formula X with one molecule of a diacid chloride of the formula $$Cl—CO—A_2—CO—Cl$$

(wherein $A_2$ represents a divalent symmetric hydrocarbon group containing up to 10 carbon atoms) to form initially a compound of the general formula:

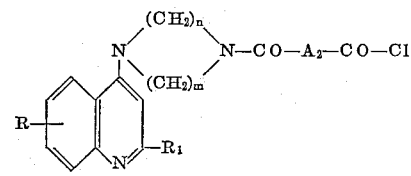

and reaction of that compound with one molecule of a quinoline derivative of the general formula:

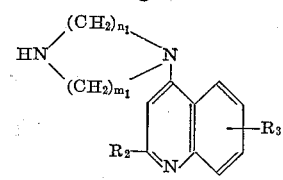

(c) In the case where the symbol $A_1$ represents a divalent asymmetric hydrocarbon group, condensation of one molecule of a quinoline derivative of Formula X with one molecule of a diacid chloride of the formula:

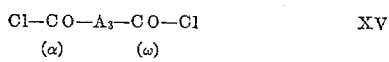

(wherein $A_3$ represents a divalent asymmetric hydrocarbon group containing up to 10 carbon atoms), separation of the compounds obtained of the formulae:

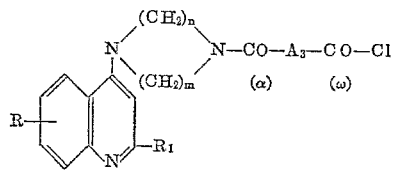

and

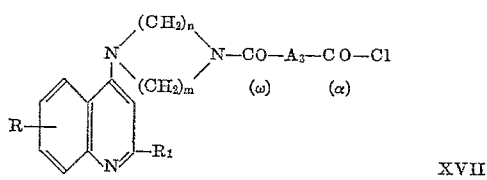

and reaction of the intermediate product of Formula XVI or XVII with a quinoline derivative of Formula XIV.

According to a still further feature of the invention, the quinoline derivatives of Formula I, in which A represents an alkylene group, are prepared by hydrogenation of a compound of the general formula:

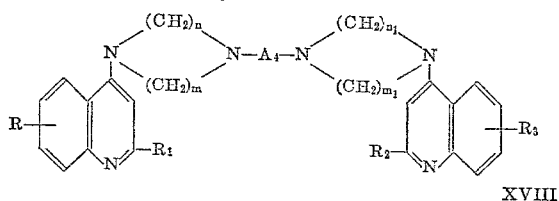

(wherein $A_4$ represents an alkynylene or alkenylene group containing up to 12 carbon atoms, and the other symbols are as hereinbefore defined) to convert any ethylene (i.e. $-C\equiv C-$) or vinylene (i.e. $-CH=CH-$)

grouping present in the chain $A_4$ to the ethylene (i.e. $-CH_2-CH_2-$) group. The hydrogenation is preferably effected by catalytic reduction in the presence of Raney nickel or Adams' platinum at atmospheric pressure and ambient temperature.

Those quinoline derivatives of Formula I in which A represents an alkenylene group are obtained, according to another feature of the invention, by the partial hydrogenation of a compound of Formula XVIII (wherein $A_4$ represents an alkynylene group) to convert by methods known per se any ethynylene grouping present in the chain $A_4$ to the vinylene group.

It is to be understood that the diazacycloalkane rings in the starting materials of the Formulae II, III, IV, VI to XIV, XVI, XVII and XVIII employed in the aforementioned processes may carry one or more alkyl groups.

The quinoline derivatives of Formula I may be converted by methods known per se into acid addition salts. Thus, the acid addition salts may be obtained by the action of an acid on the quinoline derivative in an appropriate solvent such as an alcohol, an ether, a ketone, or water. The acid addition salt which is formed is precipitated, if necessary after concentration of its solution, and is separated by filtration or decantation.

The new quinoline derivatives of the present invention and their non-toxic acid addition salts possess chemotherapeutic properties. They are, in particular, useful as antimalarials, anthelmintics and amoebicides. Preferred compounds are those of Formula I wherein A represents an alkylene group, R and $R_3$ each represent a chlorine atom in the 7-position of the quinoline nucleus, and the symbols $n$, $m$, $n_1$ and $m_1$ represent 2, and especially such compounds wherein A represents a trimethylene tetramethylene or pentamethylene group. Compounds of outstanding importance are 1,3-bis(1,7'-chloro-4'-quinolyl-4-piperazinyl)propane, 1,5-bis(1-7'-chloro-4'-quinolyl-4-piperazinyl)pentane, 1,10-bis(1,7'-chloro-4'-quinolyl-4-piperazinyl)decane, 1,5-bis(1-7'-chloro-4'-quinolyl-4-piperazinyl)-3,3-dimethylpentane, and 1,4-bis(1,7'-chloro-4'-quinolyl-4-piperazinyl)butane, and their non-toxic acid addition salts.

For thereapeutic purposes, the bases of general Formula I are preferably employed as such or in the form of non-toxic acid addition salts, i,e, salts containing anions which are relatively innocuous to the animal organism is therapeutic doses of the salts (such as hydrochlorides and other hydrohalides, phosphates, nitrates, sulphates, acetates, propionates, succinates, benzoates, fumarates, maleates, theophylline - acetates, salicylates, phenolphathalinates, methylene-bis-$\beta$-hydroxynaphthoates (also known as embonates), resorcylates, gentisates, and p-hydroxyisophthalates) so that the beneficial physiological properties inherent in the bases are not vitiated by side effects ascribable to the anions.

The following examples illustrate the invention.

*Example 1*

A mixture of 4,7-dichloroquinoline (79.2 g.), 1,3-bis-1'-piperazinylpropane (42.4 g.) and phenol (75.3 g.) is heated on an oil-bath to 110° C. The temperature then rises of its own accord and the oil-bath is removed so that the temperature does not exceed 140° C. When the reaction subsides, the reaction mixture is heated for 20 hours at 115–120° C. and then poured at about 90° C. into a solution of sodium hydroxide (40 g.) in distilled water (500 cc.). The crude base precipitates, butanol (500 cc.) is added and, after several minutes stirring, the base crystallises. The crystalline slurry is separated and washed with distilled water until no traces of alkalinity are found in the filtrate. By drying at 45° C./20 mm. Hg for 16 hours, a product (105 g.), M.P. 198-200° C., is obtained which is then dissolved in dimethylformamide (450 cc.) at 120-130° C. Decolourising charcoal (5 g.) is added and filtered hot. After cooling, the base crystallises and is separated, washed with dimethylformamide (100 cc.) followed by distilled water (1.25 litres) and dried at 50° C./20 mm. Hg for 24 hours, giving 1,3-bis(1-7'-chloro-4'-quinolyl-4-piperazinyl)-propane (59 g.), M.P. 198-200° C.

1,3-bis-1'-piperazinylpropane (216 g.), B.P. 125–127° C./0.1 mm. Hg, is obtained from 1,3-bis(1-ethoxycarbonyl-4-piperazinyl)-propane (369 g.), B.P. 195–200° C./0.1 mm. Hg, itself obtained by the condensation of 1,3-dibromopropane (303 g.) with 1-ethoxy-carbonyl-piperazine (474 g.), in the presence of triethylamine.

*Example II*

A mixture of 4,7-dichloroquinoline (79.2 g.), trans-1,4-bis-1'-piperazinylmethyl-cyclohexane (56.0 g.) and phenol' (75.3 g.) is heated in the same way as described in Example I and the reaction mass is then run, at about 90° C., into a solution of sodium hydroxide (40 g.) in distilled water (400 cc.). A crude base crystallises which is separated and washed with distilled water (1,2 litres). After drying for 16 hours at 50° C./20 mm. Hg, the base (143 g.) is obtained in not completely dehydrated form. This product is dissolved in boiling benzyl alcohol (750 cc.) and a portion (50 cc.) distilled off to dry the product azeotropically. Decolourising charcoal (10 g.) is added, filtered hot and rinsed with benzyl alcohol (150 c.). The filtrate and the washing liquors are combined. After stirring for 15 hours at laboratory temperature, the base crystallises and is separated, washed with benzyl alcohol (100 cc.) followed by ethanol (500 cc.) and dried for 15 hours at 60° C./0.2 mm. Hg to give trans-1,4- bis(1,7'-chloro-4'-quinolyl-4 - piperazinyl - methyl)cyclohexane (80 g.), M.P. 276–277° C.

Trans-1,4-bis-1'-piperazinylmethyl - cyclohexane. M.P. 144–146° C., used as starting material is prepared by the removal of the ethoxycarbonyl group from the product of the condensation of 1-ethoxycarbonylpiperazine (158 g.) with trans-1,4-bis-iodomethyl-cyclohexane (182 g.), M.P. 78–79° C., in the presence of triethylamine.

*Example III*

A mixture of 4,7-dichloroquinoline (79.2 g.), phenol (76 g.) and 1,6-bis-1'-piperazinyl-hexane (50.8 g.) is heated at 160° C. for 15 minutes. After cooling to 100° C., the reaction mass is poured into a mixture of water (1,500 cc.) and sodium hydroxide solution (d.=1.33; 150 cc.). The base which precipitates is extracted with methylene chloride (1,000 cc.), and the extract obtained is itself extracted with a mixture of water (1,000 cc.) and pure methanesulphonic acid (77 g.). The aqueous layer is decanted, clarified by stirring with decolourising charcoal (10 g.), and filtered. The filtrate is made alkaline with ammonia (d.=0.925; 80 cc.). The basic product precipitates and is separated and washed with water (3 x 200 cc.). Recrystallisation of the damp product, firstly from ethanol (1,200 cc.) and then from a mixture of toluene (1,000 cc.) and ethanol (250 cc.), gives, after drying at 60° C./0.05 mm. Hg, 1,6-bis(1-7'-chloro-4'-quinolyl-4 - piperazinyl)hexane (36 g), M.P. 173° C.

1,6-bis-1'-piperazinyl-hexane, M.P. 65° C., used in this reaction is prepared from 1,6-bis(1-ethoxycarbonyl-4-piperazinyl)hexane dihydrochloride (117 g.), itself obtained by the condensation of 1,6-dibromohexane (77.5 g.) with 1-ethoxy-carbonylpiperazine (100 g.) in the presence of sodium carbonate.

*Example IV*

A mixture of 1,5-bis-1'-piperazinyl-pentane (55 g.), 4,7-dichloroquinoline (92 g.) and phenol (94 g.) is heated for 10 minutes at 180° C. and, after cooling to about 100° C., the reaction mass is poured into a mixture of water (1,200 cc.) and sodium hydroxide solution (d.=1.33; 150 cc.). The base which precipitates is extracted with methylene chloride (1,500 cc.). The methylene chloride solution is extracted with a mixture of methanesulphonic acid (88.5 g.) and water (1,000 cc.). The organic phase is decanted and the aqueous solution of the methanesulphonate treated with sodium hydroxide solution (d.=1.33; 100 cc.) and chloroform (1,500 cc.). The aqueous layer is separated and discarded and the chloroform layer chromatographed through a column (diameter=4.5 cm., height=60 cm.) containing alumina (800 g.). The column is then eluted with chloroform (3 litres) and the eluate evaporated to dryness on a water-bath. The residue is treated with acetone (400 cc.). A product crystallises which is separated, washed with acetone (200 cc.), recrystallised from toluene (500 cc.) and dried at 60° C./0.5 mm. Hg for 16 hours to give 1,5-bis(1,7'-chloro-4'-quinolyl-4-piperazinyl)pentane (52 g.), M.P. 161° C.

1,5-bis-1'-piperazinyl-pentane used as starting material in this preparation is obtained from 1,5-bis(1-benzyl-4-piperazinyl)pentane (105 g.), itself obtained by the reduction of 1,5-bis(1-benzyl-4-piperazinyl)-1,5-dioxo-pentane (122 g.), M.P. 46° C. The latter compound is prepared by the condensation of glutaryl chloride (50 g.) with 1-benzylpiperazine (105 g.).

*Example V*

A mixture of 4-chloro-7-methoxyquinoline (77.4 g.), 1,3-bis-1'-piperazinyl-propane (42.4 g.) and phenol (75.3 g.) is heated at 130° C. for 19 hours under an atmosphere of nitrogen. The reaction mass is poured into a mixture of sodium hydroxide solution (d.=1.33; 160 cc.) and water (500 cc.). The precipitated base is extracted with chloroform (1,250 cc. total). After decanting, the chloroform phase is washed with water (600 cc.) and the solvent removed by distillation, initially at atmospheric pressure and then under reduced pressure (25 mm. Hg). The crude product is twice recrystallised from ethanol (500 cc. on each occasion) giving 1,3-bis(1-7'-methoxy-4'-quinolyl-4-piperazinyl)propane (54 g.), M.P. 180° C.

*Example VI*

A mixture of 1,10-bis-1'-piperazinyl-decane (39.7 g.), 4,7-dichloroquinoline (50.3 g.) and phenol (47.8 g.) is heated to about 125° C. and the reaction is controlled by external cooling so that the temperature does not exceed 135° C. The reaction mass is then heated for 3 hours at 125° C. and taken up in a solution of sodium hydroxide (40 g.) in distilled water (350 cc.). The base which separates is twice extracted with chloroform (700 cc. total). The chloroform solution is washed with distilled water (200 cc.) and dried over anhydrous sodium sulphate (10 g.). After filtration, the chloroform is removed on a water-bath under reduced pressure (20 mm. Hg), giving a dry, oil extract (81 g.) to which methyl ethyl ketone (300 cc.) is immediately added. Solution is obtained by heating on a water-bath; on cooling the product crystallises. The solution and crystalline product are allowed to stand for 16 hours at laboratory temperature and the product is then separated and washed with methyl ethyl ketone (150 cc.). Drying for 18 hours at 50° C./ 0.2 mm. Hg gives 1,10-bis(1-7'-chloro-4'-quinolyl-4-piperazinyl)decane (57 g.), M.P. 119–121° C.

1,10-bis-1'-piperazinyl-decane, M.P. 80–82° C., used as starting material is obtained from 1,10-bis(1-ethoxycarbonyl-4-piperazinyl)decane (88 g.), M.P. 45–47° C., itself obtained by the condensation of 1,10-dibromodecane (82 g.) with 1-ethoxycarbonylpiperazine (85 g.).

*Example VII*

A mixture of phenol (86.4 g.), 4,7-dichloroquinoline (37 g.) and 1,4-bis-1'-piperazinylmethyl-benzene (26 g.) is heated for 6 hours at 140° C. The mass obtained is poured into a solution of sodium hydroxide (80 g.) in distilled water (500 cc.) and the liberated base extracted with chloroform (500 cc.). The chloroform solution is treated with a solution of methane-sulphonic acid (38.5 g.) in distilled water (150 cc.). After decanting, a solution of sodium hydroxide (24 g.) in water (40 cc.) is added to the aqueous solution obtained. The liberated base is extracted with chloroform (650 cc.) and the chloroform solution dried over sodium sulphate (20 g.) and chromatographed through alumina (250 g.) in a column (diameter=4 cm., height=130 cm.). Elution is effected with methylene chloride (1,000 cc.) and solvent is then removed from the eluate on a water-bath at atmospheric pressure. Ethyl acetate (100 cc.) is added to the dry extract and the product crystallises. It is then recrystallised from n-butanol (500 cc.), separated, washed with n-butanol (20 cc.) and dried for 40 hours at 50° C./20 mm. Hg, to give 1,4-bis(1-7'-chloro-4'-quinolyl-4-piperazinylmethyl)benzene (24 g.), M.P. 217–218° C.

1,4-bis-1'-piperazinylmethyl-benzene (27.8 g.) is obtained by the reaction of p-xylylene chloride (35 g.) with anhydrous piperazine (129 g.).

*Example VIII*

A mixture of 7-chloro-4-1'-piperazinyl-quinoline (4.95 g.), 1,3-dibromopropane (2 g.), triethylamine (2 g.) and methyl ethyl ketone (100 cc.) is heated under reflux for 15 hours. The solvent is removed by distillation under reduced pressure (20 mm. Hg) and the residue taken up in chloroform (100 cc.), ethanol (10 cc.) and water (50 cc.). After decanting, the chloroform phase is washed with water (50 cc.). The solvent is then removed by distillation, initially at atmospheric pressure and then under reduced pressure (20 mm. Hg) and the crude product taken up in boiling ethanol (50 cc.). After cooling and filtering, the product is washed with ethanol (15 cc.) and dried at laboratory temperature at 0.5 mm. Hg for 4 hours to give 1,3-bis(1-7'-chloro-4'-quinolyl-4-piperazinyl)propane (3.5 g.), M.P. 198–199° C.

7-chloro-4-1'-piperazinyl-quinoline (178 g.), M.P. 115° C., is obtained by the condensation of 4,7-dichloroquinoline (200 g.) with piperazine (178 g.).

*Example IX*

A mixture of 1-(1-7'-chloro-4'-quinolyl-4-piperazinyl)-2-chloroethane (3.1 g.), 7-chloro-4-1'-piperazinyl-quinoline (2.47 g.), sodium iodide (1.49 g.), triethylamine (1.01 g.) and methyl ethyl ketone (25 cc.) is heated under reflux for 5 hours. After cooling, the precipitate is filtered off and washed with distilled water until the filtrate is neutral. After drying, the crude product is recrystallised from dimethylformamide, giving 1,2-bis(1-7'-chloro-4'-quinolyl-4-piperazinyl)ethane (2.4 g.), M.P. 228–230° C.

1 - (1 - 7' - chloro-4'-quinolyl-4-piperazinyl)-2-chloroethane (6.7 g.), M.P. 103° C., is obtained from 2-(1-7'-chloro-4'-quinolyl-4-piperazinyl)ethanol (11.6 g.), M.P. 115–116° C., prepared by the condensation of 1-2'-hydroxyethyl-piperazine with 4,7-dichloroquinoline.

*Example X*

A mixture of 1,5-bis-1'-piperazinyl-3,3-dimethylpentane (18.8 g.), 4,7-dichloroquinoline (27.7 g.) and phenol (26.3 g.) is heated on an oil-bath with stirring. When the temperature reaches 120° C. the reaction commences. The oil-bath is then removed and the reaction mixture cooled with a current of air. When the reaction has subsided, heating is continued for 1 hour at 125° C. The reaction mass obtained is run at about 100° C. into a solution of sodium hydroxide (19 g.) in distilled water (200 cc.) and the base which precipitates is extracted with chloroform (400 cc.). The chloroform extract is itself extracted with a solution of methanesulphonic acid (30 g.) in distilled water (100 cc.) and then with distilled water (200 cc.). The extracts are combined and made alkaline by the addition of a solution of sodium hydroxide (14 g.) in distilled water (25 cc.). The base which precipitates is taken up in chloroform (200 cc.). The chloroform layer is decanted, dried over sodium sulphate, filtered and the solvent removed on a water-bath. A dry extract (41.8 g.) is obtained which is taken up in acetone (250 cc.) on a water-bath. Crylstallisation proceeds very rapidly and, after 15 hours in the refrigerator, the product is separated, washed with acetone (100 cc.) and dried for 2 hours at 50° C./0.1 mm. Hg, giving a base (30.6 g.), M.P. 174–176° C. After recrystallisation from ethanol (400 cc.), separating, washing with the same solvent (100 cc.) and drying for 10 hours at 50° C./0.1 mm. Hg, 1,5-bis - (1-7'-chloro-4'-quinolyl-4-piperazinyl)-3,3-dimethylpentane (18.8 g.), M.P. 177–178° C., is obtained.

1,5-bis-1'-piperazinyl-3,3-dimethylpentane (18.8 g.) used as starting material is prepared by the debenzylation, in the presence of palladium, of 1,5-bis(4-benzyl-1-piperazinyl)-3,3-dimethylpentane (56 g.), M.P. 70–73° C. This compound (56 g.) is prepared by the reduction with lithium aluminum hydride of 1,5-bis-(4-benzyl-1-piperazinyl)-1,5-dioxo-3,3-dimethylpentane (67.2 g.), itself prepared by the condensation of 1-benzylpiperazine with 3,3-dimethyl-glutaryl chloride in the presence of triethylamine in acetone as solvent.

*Example XI*

A mixture of 1,4-bis-1'-piperazinyl-butane (50 g.), 4,7-dichloroquinoline (87.5 g.) and phenol (94 g.) is heated with stirring. When the temperature reaches 140° C. the reaction commences and heating is ceased. The temperature rises to 170° C. and, when the reaction has subsided, the mixture is again heated for 1 hour at 150° C. The reaction mass is poured while still hot (about 100° C.) into a solution of sodium hydroxide (64 g.) in distilled water (1,100 cc.). The base which precipitates is extracted with methylene chloride (2.5 litres). The decanted organic layer is extracted with a solution of methanesulphonic acid (56.5 g.) in distilled water (1 litre). The aqueous layer is separated and decolourising charcoal (3 g.) added. After filtering, the filtrate is made alkaline with sodium hydroxide solution (d.=1.33; 85 cc.). The base which separates is extracted with methylene chloride (1.5 litres). The organic extract is clarified by stirring with anhydrous sodium sulphate (30 g.), filtered and the solvent removed under reduced pressure (20 mm. Hg) at 40° C. giving an oil (90 g.). After the addition of diisopropyl ether (250 cc.), the base crystallises and is separated and washed with diisopropyl ether (100 cc.), giving after drying for 4 hours at 50° C./20 mm. Hg, a base (57 g.), M.P. 178–180° C.

The above base is extracted with methylene chloride (1.5 litres) and insoluble material (6 g.) filtered off. The filtrate is chromatographed over alumina (600 g.) in a column (diameter=5 cm., height=65 cm.) and eluted with methylene chloride (6.5 litres). The various fractions obtained are evaporated on a water-bath under reduced pressure (20 mm. Hg). The products melting between 180 and 184° C. are combined and taken up in toluene (500 cc.). Toluene (50 cc.) is distilled off to dehydrate the solution which is then left to cool. The purified base crystallises and is separated, washed with toluene (100 cc.) and dried for 16 hours at 50° C./0.2 mm. Hg, giving 1,4-bis(1-7'-chloro-4'-quinolyl-4-piperazinyl)butane (26 g.), M.P. 185–186° C.

1,4-bis-1'-piperazinylbutane used as starting material in this preparation is prepared by the debenzylation of 1,4-bis-(4-benzyl-1-piperazinyl)butane (120 g.), itself obtained by the reduction with lithium aluminum hydride of 1,4-bis(4-benzyl-1-piperazinyl)-1,4-dioxo-butane (127 g.), M.P. 156–157° C. This latter compound is prepared by the condensation of benzylpiperazine (152 g.) with succinyl chloride (66.5 g.) in the presence of triethylamine in acetone as solvent.

*Example XII*

A solution of trans-1,4-dibromobut-2-ene (21.4 g.) in chloroform (50 cc.) is introduced, over 20 minutes with stirring, into a mixture of 1-7'-chloro-4'-quinolylpiperazine (49.5 g.), chloroform (200 cc.) and anhydrous triethylamine (20.2 g.), the temperature being maintained at 25° C. When the addition is complete, the mixture is heated under reflux for 1 hour. After cooling, the chloroform is removed under reduced pressure (20 mm. Hg) and the residue taken up in water (500 cc.). The crystalline precipitate which forms is separated and washed with ethanol (40 cc.). After recrystallisation from n-butanol (300 cc.), separating and washing with n-butanol (10 cc.), drying at 65° C./0.05 mm. Hg gives trans-1,4-bis(1-7'-chloro-4'-quinolyl-4-piperazinyl)but-2-ene (29 g.), initially melting at 192–194° C., resolidifying and melting again at 200° C.

*Example XIII*

A solution formed from trans-1,4-bis(1-7'-chloro-4'-quinolyl-4-piperazinyl)but-2-ene (2.75 g.), methanol (100 cc.) and methanesulphonic acid (1.92 g.) in the presence of Adams' platinum (0.5 g.), which has previously been reduced, is hydrogenated at laboratory temperature and atmospheric pressure. In 20 minutes 115 cc. of hydrogen is absorbed. The catalyst is filtered off, the methanol removed and the residue taken up in water (50 cc.). After making alkaline with sodium hydroxide solution (d.=1.33; 2 cc.), the base is extracted with chloroform (50 cc.), dried over sodium sulphate and the solvent removed at 40° C./20 mm. Hg. The oily residue is taken up in boiling benzene (10 cc.). After cooling, the product is separated and dried for 16 hours at 60° C./0.05 mm. Hg, giving 1,4-bis(1-7'-chloro-4'-quinolyl-4-piperazinyl)butane (1.2 g.), M.P. 184–185° C., which is identical to the produce of Example XI.

*Example XIV*

A solution of 1,4-dichlorobut-2-yne (15 g.) in benzene (100 cc.) is poured over 1 hour with stirring into a mixture of 1-7'-chloro-4'-quinolylpiperazine (124 g.) and benzene (300 cc.) heated to 60° C. When the addition is complete, the mixture is heated under reflux for 2 hours. After cooling, the precipitate formed is separated. The filtrate is then evaporated an the residue (76 g.) taken up in boiling chloroform (500 cc.). Insoluble material is separated by filtration and the chloroform driven off from the filtrate. The residue crystallises on the addition of ethyl acetate (200 c.) and the crystalline precipitate obtained (63 g.) is collected. This product is purified in the following manner:

The product (63 g.) is dissolved in methanesulphonic acid (52 g.) and distilled water (500 cc.) and the solution made alkaline by the addition of sodium hydroxide (30 g.) and distilled water (50 cc.). The free base is extracted with chloroform (300 cc.). Evaporation of the chloroform gives a residue (48 g.) which is dissolved in trichloro-ethylene (750 cc.). This solution is concentrated at 40° C./20 mm. Hg (to a volume of 250 cc.). The product which crystallises is separated and washed with ethyl acetate (50 cc.). After drying at 60° C./0.2 mm. Hg for 6 hours, a product (36 g.) is obtained which is taken up in boiling toluene (750 cc.). A small quantity of insoluble material is removed and the filtrate concentrated (to 500 cc.). The product crystallises and is collected, washed with toluene (60 cc.) and dried for 16 hours at 75° C./0.2 mm. Hg to give 1,4-bis(1-7'-chloro-4'-quinolyl-4-piperazinyl)but-2-yne (25 g.), M.P. 202–203° C.

The 1,4-dichlorobut-2-yne, B.P. 32–34° C./0.1 mm. Hg, used as starting material in this preparation is obtained by the chlorination of but-2-yne-1,4-diol (16 g.) in pyridine as solvent.

*Example XV*

Adams' platinum (20 mg.) and acetic acid (15 cc.) are placed in a flask (125 cc.) piped for hydrogenation and the catalyst saturated with hydrogen at atmospheric pressure and laboratory temperature. 1,4-bis(1-7'-chloro-4'-quinolyl-4-piperazinyl)but-2-yne (prepared as described in Example XIV; 0.5 g.) is introduced and hydrogenated at atmospheric pressure and laboratory temperature. After 18 hours, hydrogenation is terminated. The catalyst is then separated by filtration and the apparatus and filter washed with acetic acid (6 cc.). The solvent is evaporated at 50° C./20 mm. Hg and the dry residue taken up in distilled water (10 cc.) and made alkaline with normal sodium hydroxide solution (10 cc.). The base which separates is extracted with chloroform (20 cc.). The chloroform solution is washed with distilled water (40 cc.), decanted and dried over sodium sulphate. The solvent is removed under reduced pressure (20 mm. Hg). Toluene (20 cc.) is added to the dry extract obtained and the solvent distilled off to dehydrate the product azeotropically until the volume is only 4 cc. On cooling, a product crystallises which is collected, washed with toluene (1 cc.) followed by cyclohexane (6 cc.) and then dried in vacuo (0.1 mm. Hg) at laboratory temperature for 20 hours, giving 1,4-bis(1-7'-chloro-4'-quinolyl-4-piperazinyl)butane (50 mg.), M.P. 182–184° C. A mixture of this compound with a sample of the product prepared according to Example XI melts at 182–184° C.

*Example XVI*

A mixture of 1,4-bis(1-7'-chloro-4'-quinolyl-4-piperazinyl)-1-oxo-butane (28.2 g.), lithium aluminum hydride (7.6 g.) and tetrahydrofuran (515 cc.) is heated under reflux for 4 hours. The suspension obtained is treated with distilled water (7.6 cc.), then with a solution of sodium hydroxide (1.1 g.) in distilled water (7.5 cc.) and finally with distilled water (23 cc.). The suspension is filtered and the filtrate concentrated on a water-bath. The whie solid which precipitates is collected and recrystallized from methyl ethyl ketone (225 cc.). The solid obtained is then subjected to chromatography on alumina (40 g.) in a column (diameter=2 cm., height = 50 cm.), with elution with methylene chloride (400 c.). The first fraction (100 cc.) is discarded. The second fraction (300 cc.) is evaporated to dryness and the white solid obtained is dehydrated by the addition of toluene followed by azeotropic distillation. After recrystallisatoin from toluene (5 cc.), the product is dried for 18 hours at 70° C./0.1 mm. Hg, giving 1,4-bis(1-7'-chloro-4'-quinolyl-4-piperazinyl)butane (0.22 g.), M.P. 182–183° C. A mixture of equal parts of this compound and the product of Example XI melts at 182–183° C.

1,4 - bis(1 - 7'-chloro-4'-quinolyl-4-piperazinyl)-1-oxobutane (76.6 g.), M.P. 140–143° C., is obtained by reacting 1-7'-chloro-4'-quinolylpiperazine (74.3 g.) with 1-(1-7' - chloro - 4'-quinolyl-4-piperazinyl)-1-oxo-4-chlorobutane (105 g.), M.P. (picrate) 227–229° C.

1 - (1 - 7' - chloro-4'-quinolyl-4-piperazinyl)-1-oxo-4-chlorobutane (105 g.), is obtained by reacting 1-7'-chloro-4'-quinolylpiperazine (74.3 g.) with 4-chlorobutyryl chloride (42.3 g.).

*Example XVII*

A mixture of 1-(1-7'-chloro-4'-quinolyl-4-piperazinyl)-3-1'-piperazinylpropane (7.5 g.), 4,7-dichloroquinoline (4 g.) and phenol (11.5 g.) is heated for 6 hours at 135° C. and the mass obtained then poured into a solution of sodium hydroxide (15 g.) in distilled water (150 cc.). The base which separates is extracted with chloroform (350 cc.). After decanting, the chloroform solution obtained is treated with methanesulphonic acid (13 g.) in distilled water (175 cc.). The aqueous solution of the methanesulphonate is made alkaline with sodium hydroxide (10 g.) in water (15 cc.). The base which separates is extracted with chloroform (250 cc.) and the combined chloroform extracts are dried over sodium sulphate (15 g.). The solution obtained is chromatographed over alumina (100 g.) in a column (diameter= 3 cm., height=40 cm.) and eluted with methylene chloride (300 cc.). The eluates are evaporated to dryness and the residue recrystallized from acetonitrile (30 cc.). The crystals are collected, washed with acetonitrile (15 cc.) and dried for 18 hours at 70° C./0.1 mm. Hg, to give 1,3 - bis(1-7' - chloro-4'-quinolyl-4-piperazinyl)propane (1.8 g.), M.P. 199–200° C. This product is identical with those of Examples I and VIII.

1 (1 - 7' - chloro - 4' - quinolyl - 4 - piperazinyl) - 3-1'-piperazinylpropane (74.7 g.) used as starting material is prepared by the removal of the ethoxycarbonyl group from 1 - (1 - 7' - chloro-4'-quinolyl-4-piperazinyl)-3-(1-ethoxycarbonyl-4-piperazinyl)propane (89 g.), itself prepared by the reaction of 1-(7-chloroquinolyl)-4-(3-chloropropyl)piperazine (68 g.) on the hydrochloride of 1-ethoxycarbonylpiperazine (38.9 g.).

*Example XVIII*

A mixture of 4,6-dichloroquinoline (39.6 g.), 1,3-bis-1'-piperazinylpropane (21.2 g) and phenol (37.7 g) is heated at 130° C. for 20 hours under an atmosphere of nitrogen and the reaction mixture then run into sodium hydroxide solution (d.=1.33; 80 cc.) diluted with water (250 cc.). The crude base precipitates and is collected and washed with water (2 x 50 cc.). Recrystallisation from a mixture of ethanol (225 cc.) and water (75 cc.) and drying at 50° C./0.5 mm. Hg, gives 1,3-bis(1-6'-chloro-4'-quinolyl-4-piperazinyl)propane (34 g.) in the form of a hydrate containing one molecule of water, M.P. about 70–80° C.

*Example XIX*

A solution of 1-(1-7'-chloro-4'-quinolyl-4-piperazinyl)-

3-chloropropane (13.5 g.), 1-(6-chloro-4-quinolyl)-piperazine (10.3 g.), sodium iodide (6.2 g.) and triethylamine (4.16 g.) in methyl ethyl ketone (125 cc.) is heated under reflux for 6 hours and the reaction mixture is then run into N sodium hydroxide solution (500 cc.). The product which precipitates is filtered off, washed with water, dried and then recrystallised from isopropanol (80 cc.). Filtration, washing and drying yields 1-(1-7'-chloro-4'-quinolyl - 4 - piperazinyl)-3-(1-6'-chloro-4'-quinolyl - 4-piperazinyl)propane (11.3 g), M.P. about 95° C.

1 - (1 - 7' - chloro-4'-quinolyl-4-piperazinyl)-3-chloropropane (70.7 g.), M.P. 84° C., used as starting material is obtained by the chlorination, with thionyl chloride in chloroform under reflux, of 3-(1-7'-chloro-4'-quinolyl-4-piperazinyl)propanol (160 g.), itself obtained by the condensation of 1-(3-hydroxypropyl)piperazine (173 g.) and 4,7-dichloroquinoline (198 g.). 1-(6-chloro-4-quinolyl)-piperazine (62 g.), M.P. 95° C., is obtained by the condensation of 4,6-dichloroquinoline (80 g.) and piperazine hydrate (160 g.) in solution in N hydrochloric acid (1,650 cc.).

*Example XX*

A solution of 1-(1-7'-methoxy-4'-quinolyl-4-piperazinyl)-3-chloropropane (13.5 g.), 1-(6-chloro-4-quinolyl)piperazine (10.4 g), sodium iodide (6.3 g.) and triethylamine (4.2 g.) in methyl ethyl ketone (125 cc.) is heated under reflux for 6 hours and the reaction mixture then run into N sodium hydroxide solution (500 cc.). The oil which separates is extracted with chloroform (600 cc.). After evaporation of the solvent, the residue is dissolved in methylene chloride (540 cc.) and then chromatographed over alumina (540 g.) in a column (diameter=4 cm., height=45 cm.). Elution is carried out with methylene chloride (7,500 cc. total) and the eluates are combined and evaporated. The crystalline residue obtained is recrystallised from ethyl acetate (50 cc.) giving, after filtration, washing and drying, 1-(1-7' - methoxy-4' - quinolyl - 4 - piperazinyl) - 3 - (1 - 6'-chloro - 4' - quinolyl - 4 - piperazinyl)propane (10.2 g.), M.P. 136–138° C.

1 - (1 - 7' - methoxy - 4' - quinolyl - 4 - piperazinyl)-3-chloropropane, M.P. 103° C. (14.6 g.) used as starting material is obtained by the chlorination, with thionyl chloride in chloroform under reflux, of 3-(1-7'-methoxy-4'-quinolyl-4-piperazinyl)propanol (30.1 g.), itself obtained by the condensation of 7-methoxy-4-chloroquinoline (96.8 g.) and 1 - (3 - hydroxypropyl)piperazine (100.9 g.).

*Example XXI*

A solution of 1-(1-7'-chloro-4'-quinolyl-4-piperazinyl)-3 - chloropropane (16.2 g.), 1 - (7-methoxy-4-quinolyl)piperazine (12.1 g.), sodium iodide (7.4 g.) and triethylamine (5 g.) in methyl ethyl ketone (160 cc.) is heated under reflux for 6 hours and the reaction mixture is then run into N sodium hydroxide solution (800 cc.). The product which precipitates is filtered off, washed with water, dried and recrystallised from isopropanol (80 cc.) to give 1-(1-7'-methoxy-4'-quinolyl-4-piperazinyl)-3-(1-7'-chloro-4'-quinolyl-4-piperazinyl)propane (19.65 g.), M.P. 176° C.

1-(7-methoxy-4-quinolyl)piperazine (12.5 g.), M.P. 146° C., is obtained by the condensation of 7-methoxy-4-chloroquinoline (19.3 g.) and piperazine hydrate (39.8 g.) in solution in N hydrochloric acid (410 cc.).

*Example XXII*

A mixture of 1,9-bis-1'-piperazinyl-nonane (40 g.), phenol (50.3 g.) and 4,7-dichloroquinoline (53 g.) is heated on an oil-bath to 120° C. with stirring. Reaction commences and the temperature rises to 135° C. The temperature is then reduced to about 120° C. by cooling in a water bath for 10 minutes. When the reaction has subsided, heating on an oil-bath is resumed for 3 hours at 120° C. The reaction mass at about 80° C. is then poured into 7.5 N sodium hydroxide solution (400 cc.) and the base extracted with chloroform (700 cc.). After drying over pure anhydrous sodium sulphate (20 g.), the chloroform solution is chromatographed over alumina (850 g.) in a column (diameter=4.2 cm., height=78 cm.), and eluted with chloroform (4.5 litres). The solvent of the first 3 litres of eluate is removed on a water bath and the dry residue is taken up in acetonitrile (50 cc.). A product crystallises and, after standing for 16 hours, it is collected, washed with acetonitrile (20 cc.) and dried for 48 hours at 20° C./20 mm. Hg to give a product (40.5 g.), M.P. about 100° C. After two recrystallisations from methyl ethyl ketone (140 cc. and 100 cc.), 1,9-bis-(1-7'-chloro-4'-quinolyl-4-piperazinyl) nonane (29 g.), M.P. 115–116° C., is obtained after drying.

1,9-bis-1'-piperazinyl-nonane used as starting material is obtained by the reduction, with lithium aluminium hydride, of 1,9-bis-1'-piperazinyl-1,9-dioxo-nonane (104 g.), M.P. 240–245° C., itself prepared by the debenzylation of 1,9-bis(4-benzyl-1-piperazinyl)-1,9-dioxo-nonane (225 g.), M.P. 73–75° C. The latter product is prepared from benzylpiperazine (180 g.) and azeloyl chloride (115 g.).

*Example XXIII*

A mixture of 1-(7-chloro-4-quinolyl)-trans-2,5-dimethylpiperazine (94 g.), 1,3-dibromopropane (34.6 g), triethylamine (34.6 g.), sodium iodide (51.5 g.) and methyl ethyl ketone (1 litre) is heated at 80° C. for 8 hours. The solvent is then removed in vacuo (20 mm. Hg) on a water bath, the residue treated with distilled water (400 cc.) and the insoluble material extracted with chloroform (700 cc. total). The chloroform solution is treated with a solution of pure methanesulphonic acid (72 g.) in distilled water (250 cc.), the chloroform layer discarded and the aqueous solution made alkaline with 10 N sodium hydroxide solution (100 cc.). The base which precipitates is extracted with methylene chloride (600 cc. total) and this solution is chromatographed over alumina (1,100 g.) in a column (diameter=5.7 cm., height=100 cm.). Elution is carried out with methylene chloride (4 litres). The dry residue (71.5 g.) obtained by removal of the solvent from the eluate is dissolved in ethyl acetate (350 cc.) and a solution of picric acid (110.6 g.) in ethyl acetate (900 cc.) added. The crystalline picrate is collected and washed with ethyl acetate (150 cc.). The picrate obtained (123 g.), M.P. about 185° C., is recrystallised by dissolving in boiling dimethylformamide (450 cc.) and precipitating, after cooling, with ethyl acetate (600 cc.). A second purification is effected upon the damp picrate obtained above by proceeding as previously described with dimethylformamide (200 cc.) and ethyl acetate (650 cc.), giving a purified picrate (39 g.), M.P. 190° C. Conversion of the picrate to the base by the usual method gives a product (12 g.), M.P. about 100° C. This base is dissolved in methylene chloride (300 cc.) and chromatographed over alumina (200 g.) and eluted with methylene chloride (900 cc.), giving the purified base (9.2 g.). This base is dissolved in N hydrochloric acid (62 cc.) reprecipitated by the addition of 10 N sodium hydroxide solution (7 cc.), washed with distilled water until the filtrate is neutral and dried for 16 hours at 40° C./0.2 mm. Hg, to give 1,3-bis(1-7'-chloro-4'-quinolyl-4-trans-2,5-dimethylpiperazinyl) - propane (8 g.), M.P. about 100° C.

1-(7-chloro-4-quinolyl) - trans-2,5-dimethylpiperazine, M.P. 106–108° C., used as starting material is obtained from 4,7-dichloroquinoline (182 g.), trans-2,5-dimethylpiperazine (314 g.) and phenol (172 g.).

The present invention further includes within its scope pharmaceutical compositions which comprise, as active ingredient, at least one quinoline derivative of general Formula I, or nontoxic acid addition salt thereof, in association with a pharmaceutical carrier or coating. The invention includes especially such compositions made up for oral, rectal, or parenteral administration.

Solid compositions for oral administration include compressed tablets (including enteric coated tablets), pills, dispersible powders, and granules. In such solid compositions one or more of the active compounds is, or are, admixed with at least one inert diluent such as calcium carbonate, potato starch, alginic acid, sucrose or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and preserving, perfuming, sweetening and flavouring agents. The compositions according to the invention for oral administration also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cocoa butter or a suitable wax base.

The percentage of active ingredient in the compositions of the invention may be varied, it being necessary that it should constitute a proportion such that a suitable dosage for the therapeutic effect desired in the species of animal shall be obtained. Generally, the dosages should be between 0.5 and 15 mg. per kilogramme in weight of the animal treated. In clinical medicine, preparations of the present invention may be administered orally so as to give a daily dosage of 0.1 to 1.5 g. of active substance.

The following examples illustrate pharmaceutical compositions according to the invention.

*Example XXIV*

Tablets are prepared having the following compositions:

|  | Mg. | Mg. |
| --- | --- | --- |
| 1,3-bis(1-7'-chloro-4'-quinolyl-4-piperazinyl)propane | 250 | 100 |
| Starch | 190 | 217 |
| Silica gel | 50 | 30 |
| Magnesium stearate | 10 | 3 |
|  | 500 | 350 |

*Example XXV*

A solution is prepared having the following percentage composition:

| | |
| --- | --- |
| 1,3-bis(1-7'-chloro-4'-quinolyl-4-piperazinyl)propane _____ g__ | 2.0 |
| 1 N methanesulphonic acid _____ cc__ | 13.8 |
| 0.1 N sodium hydroxide _____ cc__ | 25 |
| 10% solution of sodium methanesulphonate __cc__ | 10 |
| Distilled water, q.s. 100 cc. | |

The solution is divided into 5 cc. ampoules and the ampoules are then sealed and sterilised by heating at 120° C. for 20 minutes.

We claim:
1. A compound selected from the class consisting of compounds of the formula:

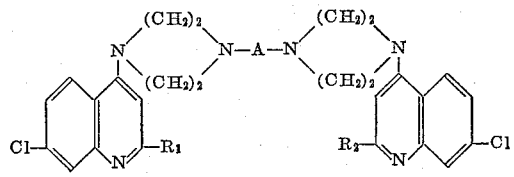

wherein A is a member selected from the class consisting of alkylene of up to 12 carbon atoms, alkenylene of up to 12 carbon atoms and alkynylene of up to 12 carbon atoms, $R_1$ and $R_2$ are each members selected from the class consisting of hydrogen and alkyl of up to four carbon atoms, and such compounds in which the piperazine rings carry at least one alkyl group containing at most 4 carbon atoms, and their non-toxic acid addition salts.

2. 1,3-bis(1-7'-chloro-4'-quinolyl - 4 - piperazinyl)propane.

3. 1,5-bis(1-7'-chloro-4'-quinolyl - 4 - piperazinyl)pentane.

4. 1,10-bis(1-7'-chloro-4'-quinolyl - 4 - piperazinyl)decane.

5. 1,5-bis(1-7'-chloro-4'-quinolyl - 4 - piperazinyl)-3,3-dimethylpentane.

6. 1,4-bis(1-7'-chloro-4'-quinolyl - 4 - piperazinyl)butane.

7. A non-toxic acid addition salt of 1,3-bis(1-7'-chloro-4'-quinolyl-4-piperazinyl)propane.

8. A non-toxic acid addition salt of 1,5-bis(1-7'-chloro-4'-quinolyl-4-piperazinyl)pentane.

9. A non-toxic acid addition salt of 1,10-bis(1-7'-chloro-4'-quinolyl-4-piperazinyl)decane.

10. A non-toxic acid addition salt of 1,5-bis(1-7'-chloro-4'-quinolyl-4-piperazinyl)-3,3-dimethylpentane.

11. A non-toxic acid addition salt of 1,4-bis(1-7'-chloro-4'-quinolyl-4-piperazinyl)butane.

References Cited in the file of this patent
UNITED STATES PATENTS
2,837,522  Bach et al. _____ June 3, 1958